US 6,687,202 B1

(12) United States Patent
Watanabe et al.

(10) Patent No.: US 6,687,202 B1
(45) Date of Patent: Feb. 3, 2004

(54) PICKUP CONTROL DEVICE FOR OPTICAL DISK DRIVE WHICH ADJUSTS LOOP GAIN OR DETERMINES SAMPLE RATE

(75) Inventors: Takahiro Watanabe, Ehime (JP); Yasushi Imamura, Ehime (JP); Masaaki Okita, Ehime (JP); Yuichi Kobayashi, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/720,547

(22) PCT Filed: Apr. 20, 2000

(86) PCT No.: PCT/JP00/02562

§ 371 (c)(1),
(2), (4) Date: Mar. 2, 2001

(87) PCT Pub. No.: WO00/65582

PCT Pub. Date: Nov. 2, 2000

(30) Foreign Application Priority Data

Apr. 27, 1999 (JP) .......................................... 11/119459

(51) Int. Cl.$^7$ ................................................. G11B 7/00
(52) U.S. Cl. ............................... 369/44.34; 369/44.35; 369/44.29
(58) Field of Search ............................... 369/47.3, 47.38, 369/53.29, 53.23, 53.37, 44.24, 44.29, 44.34, 44.35

(56) References Cited

U.S. PATENT DOCUMENTS

| 5,844,872 A | | 12/1998 | Kubo et al. | |
|---|---|---|---|---|
| 5,870,363 A | * | 2/1999 | Sun et al. | 369/50 |
| 5,883,865 A | * | 3/1999 | Kondo et al. | 369/32 |
| 5,912,867 A | * | 6/1999 | Miyazono | 369/44.27 |
| 6,018,506 A | * | 1/2000 | Okabe et al. | 369/32 |
| 6,031,801 A | * | 2/2000 | Ishikawa et al. | 369/47.24 |
| 6,055,219 A | * | 4/2000 | Ho et al. | 369/53.23 |
| 6,088,315 A | * | 7/2000 | Ando | 369/50 |
| 6,310,848 B1 | * | 10/2001 | Ueki | 369/53.37 |
| 6,389,548 B1 | * | 5/2002 | Bowles | 713/500 |

FOREIGN PATENT DOCUMENTS

JP              5-89501           4/1993

OTHER PUBLICATIONS

Japanese search report for PCT/JP00/02562 dated Sep. 6, 2000.

* cited by examiner

Primary Examiner—Gautam R. Patel
(74) Attorney, Agent, or Firm—RatnerPrestia

(57) ABSTRACT

In an optical disk drive having the structure of rotating an optical disk under the alternative control of CAV or CLV, when the optical disk is rotated under the CLV control, the loop gains for at least one of the focus servo system and the tracking servo system for controlling the operation of the pickup of the optical disk drive are adjusted based on angular velocity detected by an angular velocity detector which is also used for rotating the optical disk under the CAV control, and, when the optical disk is rotated under the CAV control, the loop gains for at least one of the focus servo system and the tracking servo system are adjusted based on linear velocity detected by a linear velocity detector which is also used for rotating the optical disk under CLV control. The above structure enables the effective saving of electricity and cost in the optical disk drive.

9 Claims, 3 Drawing Sheets

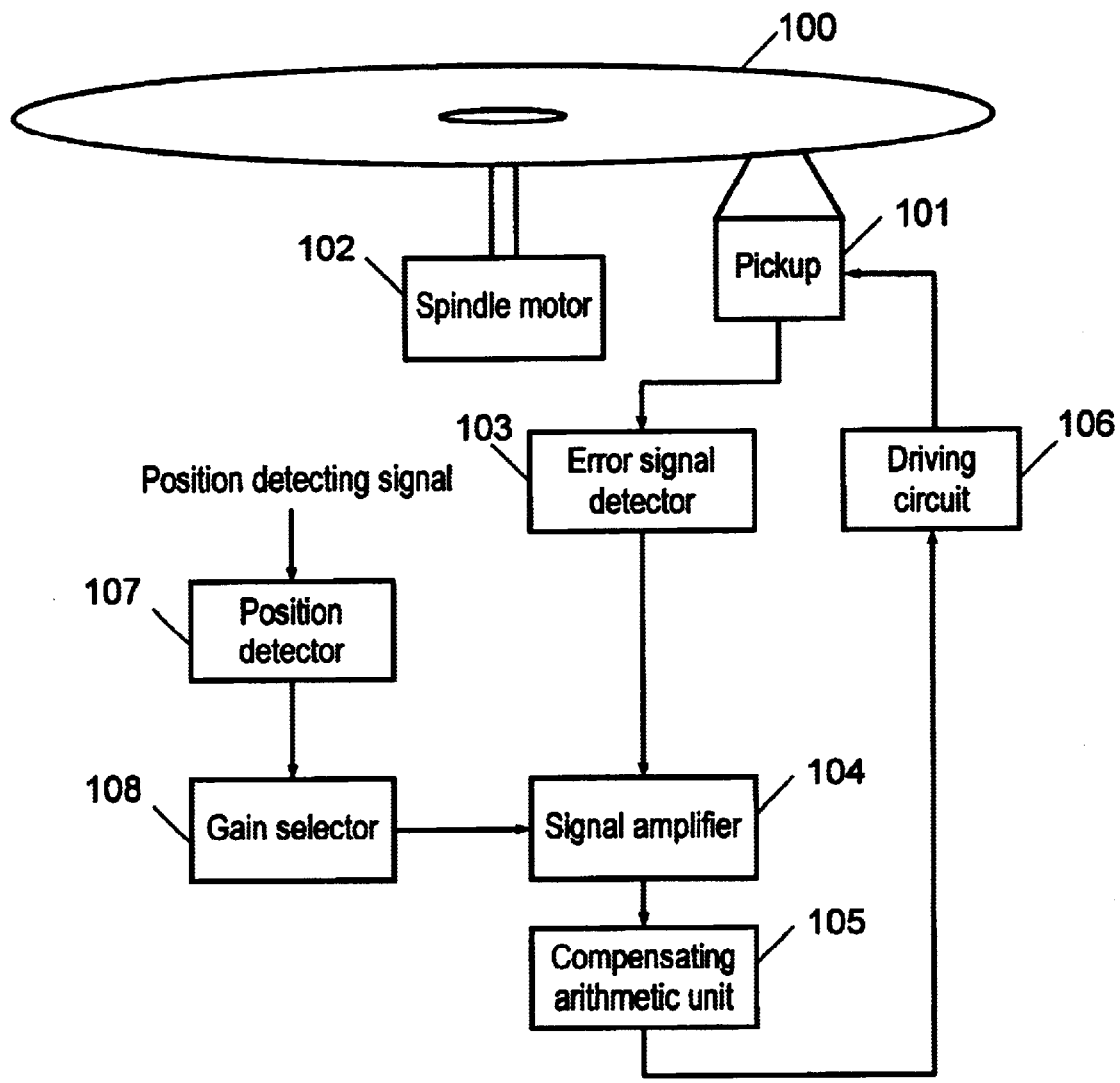

PICKUP CONTROL DEVICE FOR OPTICAL DISK DRIVE WHICH ADJUSTS LOOP GAIN OR DETERMINES SAMPLE RATE

This application is a U.S. National Phase application of PCT International Application PCT/JP00/02562 filed Apr. 20, 2000.

TECHNICAL FIELD

The present invention relates to a pickup control device for an optical disk drive, and, more particularly, the invention relates to a control system and the saving of electricity in writing or reading information on or from a rotating optical disk with the pickup of the optical disk drive comprising a focus servo system for controlling the operation of focusing a laser beam on the optical disk (hereinafter abbreviated as "focusing operation") and a tracking servo system for controlling the operation of tracing an information storing track (hereinafter abbreviated as "track") of the optical disk (hereinafter the tracing operation is abbreviated as "tracking operation").

BACKGROUND ART

In recent years, under the circumstance that the rotational velocity of an optical disk increases in operating an optical disk drive, the increase of the data processing speed in the operation of the pickup of the optical disk drive is also required. However, when the data processing speed is increased, the consumption of electricity increases in the focus servo system and the tracking servo system for the control of the operation of the pickup, and, when these servo systems comprises digital processing circuits, the frequency of a clock pulse for operating the digital processing circuits increases, which also causes the increase of the consumption of electricity.

Hereinafter a conventional pickup control device for an optical disk drive is described on reference to FIG. 3 which is a block diagram showing the structure of the conventional pickup control device. In FIG. 3, a spindle motor 102 rotates an optical disk 100. A pickup 101 writes information on the optical disk 100 or reads information from the optical disk 100. An error signal detector 103 detects a focus error signal from the output signal of the pickup 101. A signal amplifier 104 amplifies the focus error signal. A driving circuit 106 receives the amplified signal through a compensating arithmetic unit 105, and operates the pickup 101 based on the received signal. The above structure forms a focus servo system.

On the other hand, a position detector 107 detects a track position (of a disk 100) where the pickup 101 is located. A gain selector 108 adjusts the loop gain for the focus servo system by controlling the signal amplifier 104 based on the signal on the track position where the pickup 101 is located, which (i.e., the signal) is generated by the position detector 107.

In general, the superficial fluctuation of the optical disk 100 is smaller at the inner tracks of the optical disk 100 comparing with the superficial fluctuation at the outer tracks of the optical disk 100. Therefore, when the pickup 101 is located at one of the inner tracks of the optical disk 100, the loop gain for the focus servo system is adjusted to a smaller value comparing with the loop gain in the occasion that the pickup 101 is located at one of the outer tracks of the optical disk 100.

The position detector 107, for detecting the track position where the pickup 101 is located, is formed, for instance, in such a manner that a reflecting portion is formed on the pickup 101, and a light emitted from a light emitter (not illustrated) is reflected by the reflecting portion of the pickup 101, and the reflected light is received by a light sensor (not illustrated), or, the position detector 107 is formed, for instance, in such a manner that track numbers are stored in advance on the optical disk 100 (i.e., formatted), and the stored track numbers are read by the pickup 101 in the occasion of the operation of writing or reading.

Based on the track position where the pickup 101 is located, which is detected by either of the above methods, the gain selector 108 controls the signal amplifier 104 in such a manner as to optimize the loop gain for the focus servo system.

The operation of a tracking servo system is performed in a manner similar to the above description on the focus servo system.

However, in the conventional pickup control device described in the above, a light emitter, light sensor and the like, which are exclusively used for detecting the track position where the pickup is located, are needed, which causes the increase of the consumption of electricity and the cost of the optical disk drive having the above conventional pickup control device. Also, in the conventional pickup control device having the structure of detecting the track position where the pickup is located by reading stored track numbers, the effective saving of electricity is not realized because it takes time before the tracking servo system becomes stable for reading the stored track numbers rightly after switching on the optical disk drive, such that the saving of electricity in this method is also insufficient.

DISCLOSURE OF INVENTION

The object of the present invention is to address the conventional problems and to provide a pickup control device for an optical disk drive, which enables the saving of electricity and cost in the optical disk drive.

For realizing the above object, the pickup control device of the present invention has the following structure. That is, in an optical disk drive which performs the operation of writing or reading information on or from an optical disk with the pickup of the optical disk drive comprising a focus servo system for controlling the focusing operation of the pickup and a tracking servo system for controlling the tracking operation of the pickup, a pickup control device for the optical disk drive in the present invention comprises, (a) a first control system which comprises an angular velocity detector for detecting the angular velocity of the optical disk, and controls the optical disk based on the angular velocity detected by the angular velocity detector in such a manner that the optical disk enters into the state of rotation at a predetermined constant angular velocity, and (b) a second control system which comprises a linear velocity detector for detecting the linear velocity of the optical disk at the track position of the optical disk where the pickup is located, and controls the linear velocity in such a manner that the linear velocity enters into the state of a predetermined constant linear velocity, wherein the first control system and the second control system are alternatively operated in such a manner that the loop gains for at least one of the focus servo system and the tracking servo system are adjusted based on the linear velocity detected by the linear velocity detector of the second control system when the optical disk is rotated under the control of the first control system, and, the loop gains for at least one of the focus servo system and the tracking servo system are adjusted based on the angular velocity detected by the angular velocity detector of the first control system when the optical disk is rotated under the control of the second control system.

In the above structure of the pickup control device in the present invention, the operation of the pickup of the optical disk drive is optimally performed by utilizing the signal on the track position where the pickup is located, which (i.e., the signal) is generated by the angular velocity detector and the linear velocity detector which (i.e., both detectors) are also used for controlling the rotational velocity of the optical disk, without installing an additional unit comprising various component parts for detecting the track position where the pickup is located.

Also, for realizing the above object, the pickup control device of the present invention has the following structure. That is, in an optical disk drive which performs the operation of writing or reading information on or from an optical disk with the pickup of the optical disk drive comprising a focus servo system for controlling the focusing operation of the pickup and a tracking servo system for controlling the tracking operation of the pickup, a pickup control device for the optical disk drive in the present invention comprises, (a) a first control system which comprises an angular velocity detector for detecting the angular velocity of the optical disk, and controls the optical disk based on the angular velocity detected by the angular velocity detector in such a manner that the optical disk enters into the state of rotation at a predetermined constant angular velocity, and (b) a second control system which comprises a linear velocity detector for detecting the linear velocity of the optical disk at the track position of the optical disk where the pickup is located, and controls the linear velocity in such a manner that the linear velocity enters into the state of a predetermined constant linear velocity, and at least one of the focus servo system and the tracking servo system have respective digital processing circuits, wherein the first control system and the second control system are alternatively operated in such a manner that at least one of the sampling rate for operating the digital processing circuit of the focus servo system and the sampling rate for operating the digital processing circuit of the tracking servo system are determined based on the angular velocity detected by the angular velocity detector of the first control system when the optical disk is rotated under the control of the second control system.

In the above structure of the present invention, the optimal operation of the digital processing circuits is performed by utilizing the signal on the rotational velocity of the optical disk at the position where the pickup is located, which (i.e., the signal) is generated by the angular velocity detector and the linear velocity detector which (i.e., both detectors) are also used for controlling the rotational velocity of the optical disk, without installing an additional unit comprising various component parts for detecting the track position where the pickup is located.

As a result, the effective saving of electricity and cost in the optical disk drive having the above pickup control device of the present invention is realized.

BRIEF DESCRIPTION OF THE DRAWINGS

FIG. 3 is a block diagram showing a conventional pickup control device for an optical disk drive.

DETAILED DESCRIPTION OF PREFERRED EMBODIMENT

Hereinafter exemplary embodiments in the present invention are described on reference to illustrations.

First Exemplary Embodiment

Figure 1:
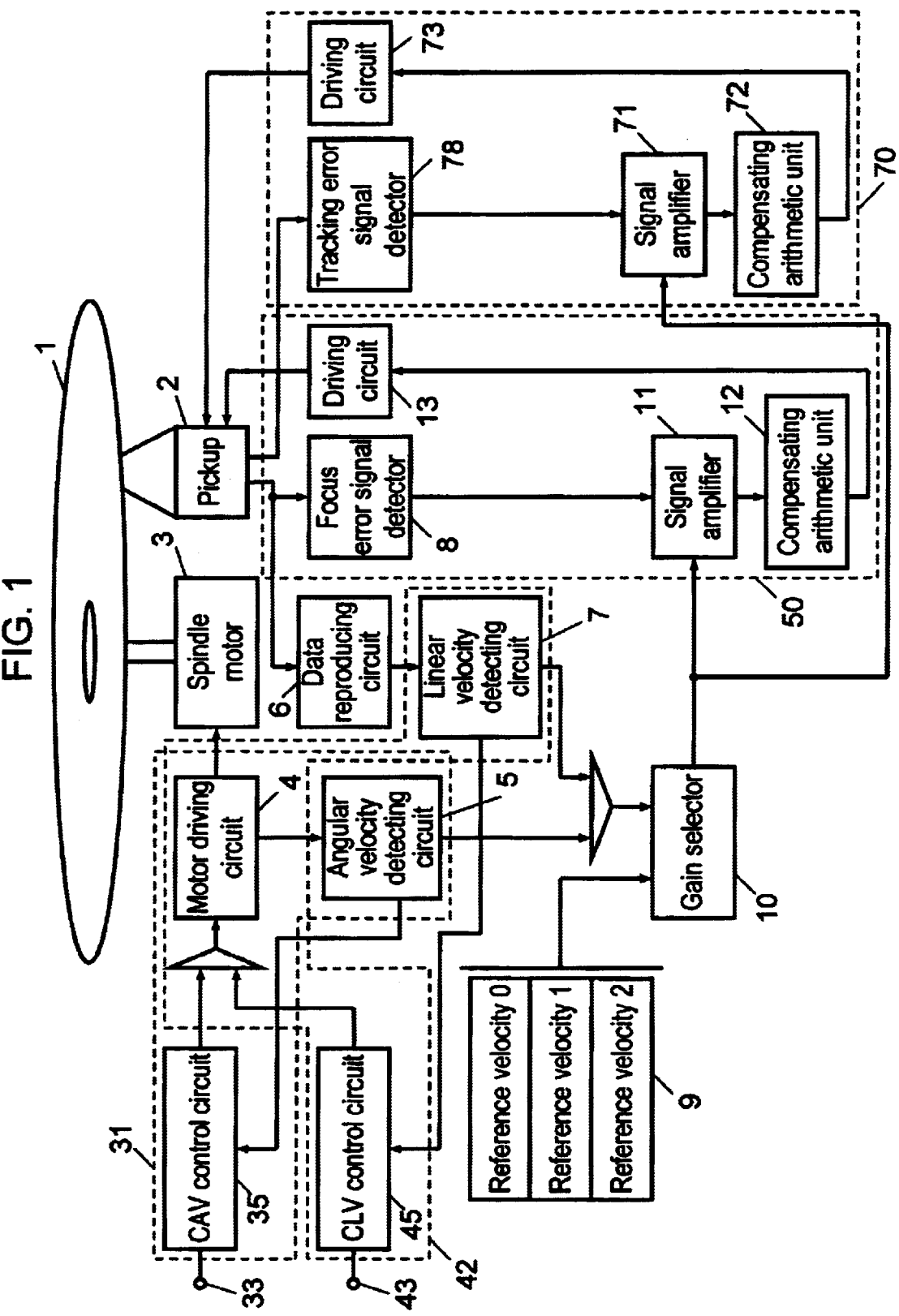
FIG. 1 is a block diagram showing a pickup control device for an optical disk drive in a first exemplary embodiment in the present invention.

FIG. 1 is a block diagram showing a pickup control device for an optical disk drive in a first exemplary embodiment in the present invention. In FIG. 1, a spindle motor 3 rotates an optical disk 1. A pickup 2 writes information on the optical disk 1 or reads recorded information from the optical disk 1. A focus-error-signal-detector 8 detects a focus error signal for the servo control of the focusing operation of the pickup 2 from the output signal of the pickup 2. A signal amplifier 11 amplifies the focus error signal, and feeds the amplified signal into a compensating arithmetic unit 12. A driving circuit 13 drives the pickup 2 based on the signal received from the compensating arithmetic unit 12. The above structure forms a focus servo system 50.

A tracking-error-signal-detector 78 detects a tracking error signal for the servo control of the tracking operation of the pickup 2 from the output signal of the pickup 2. A signal amplifier 71 amplifies the tracking error signal, and feeds the amplified signal into a compensating arithmetic unit 72. A driving circuit 73 drives the pickup 2 based on the signal received from the compensating arithmetic unit 72. The above structure forms a tracking servo system 70.

A motor driving circuit 4 drives the spindle motor 3. An angular velocity detector (e.g., angular-velocity-detecting-circuit) 5 detects the angular velocity of the motor 3. A constant angular velocity (CAV) control circuit 35 generates a CAV control signal based on the output signal of the angular-velocity-detecting-circuit 5 and a predetermined angular velocity instruction value received through a terminal 33. A motor driving circuit 4 receives the CAV control signal and rotates the optical disk 1 at a predetermined constant angular velocity based on the CAV control signal. The above structure forms a first control system 31.

A data reproducing circuit 6 reproduces information from the output signal of the pickup 2. A linear velocity detector (e.g., a linear-velocity-detecting-circuit) 7 detects the linear velocity of the disk 1 at the position where the pickup 2 is located based on the output signal of the data reproducing circuit 6. A constant linear velocity (CLV) control circuit 45 generates a CLV control signal based on the output signal of the linear-velocity-detecting-circuit 7 and a predetermined linear velocity instruction value received through a terminal 43. Based on the CLV control signal, the motor driving circuit 4 rotates the optical disk 1 in such a manner that the linear velocity of optical disk at the track position of the optical disk 1 where the pickup 2 is located enters into the state of a predetermined constant linear velocity. The above structure forms a second control system 42.

The first control system 31 and the second control system 42 are alternatively operated.

The gain selector 10 alternatively receives either angular velocity information detected by the angular-velocity-detecting-circuit 5 or linear velocity information detected by the linear-velocity-detecting-circuit 7, and compares the velocity information with a plurality of ranked reference velocities stored in a reference-velocity-storing-unit 9. Based on the result of the comparison, the gain selector 10 adjusts the gain of the signal amplifier 11 in such a manner that the value of the loop gain for the focus servo system 50 becomes one of predetermined values which are respectively set for the respective ranked reference velocities. The gain selector 10 also adjusts the gain of the signal amplifier 71 in such a manner that the loop gain for the tracking servo system 70 becomes one of predetermined values which are respectively set for the respective ranked reference velocities, based on the result of the above comparison. The plurality of reference velocities are set in such a manner, for instance, to range from an inner track toward an outer track in the order of reference-velocity-0, reference-velocity-1 and reference-velocity-2.

Hereinafter the pickup control device of this exemplary embodiment having the above structure is described on the focus servo system 50 as an example.

First, the operation of the focus servo system 50 in rotating the optical disk 1 under the CAV control by using the first control system 31 is described.

When the optical disk 1 is rotated under the CAV control, the optical disk 1 is controlled in such a manner as to rotate at a predetermined constant angular velocity based on the output signal of the angular-velocity-detecting-circuit 5. In this case, since the angular velocity is constant, the linear velocity detected by the linear-velocity-detecting-circuit 7 is lower, for instance, when the pickup 2 is located at one of the inner tracks of the optical disk 1 comparing with the linear velocity in the occasion that the pickup 2 is located at one of the outer tracks of the optical disk 1. Therefore, in rotating the optical disk 1 under the CAV control, the adjustment of the loop gain for the focus servo system 50 is performed by utilizing the change of the linear velocity of the optical disk 1. That is, the gain selector 10 receives linear velocity information detected by the linear-velocity-detecting-circuit 7 and compares the linear velocity information with the plurality of ranked reference velocities stored in the reference-velocity-storing-unit 9.

The following is a description on the operation of rotating the optical disk 1 under the CAV control by using one reference velocity (e.g., reference-velocity-1) of the plurality of reference velocities stored in the reference-velocity-storing-unit 9.

When the velocity detected by the linear-velocity-detecting-circuit 7 is lower than the reference-velocity-1, the gain selector 10 judges that the pickup 2 is located at one of the inner tracks of the optical disk 1, where the superficial fluctuation of the optical disk 1 is small, and decreases the loop gain for the focus servo system 50. On the other hand, when the velocity detected by the linear-velocity-detecting-circuit 7 is higher than the reference-velocity-1, the gain selector 10 judges that the pickup 2 is located at one of the outer tracks of the optical disk 1, where the superficial fluctuation is large, and increases the loop gain for the focus servo system 50.

The following is a description on the operation of rotating the optical disk 1 under the CAV control by using the plurality of reference velocities (e.g., reference-velocity-0, reference-velocity-1 and reference-velocity-2), which are stored in the reference-velocity-storing-unit 9, are used.

When the velocity detected by the linear-velocity-detecting-circuit 7 is lower than the reference-velocity-0, the gain selector 10 judges that the pickup 2 is located at the innermost track of the optical disk 1. When the velocity detected by the linear-velocity-detecting-circuit 7 is higher than the reference-velocity-0 but lower than the reference-velocity-1, the gain selector 10 judges that the pickup 2 is located at an intermediate-track-A between the innermost track and the outermost track of the optical disk 1. When the velocity detected by the linear-velocity-detecting-circuit 7 is higher than the reference-velocity-1 but lower than the reference-velocity-2, the gain selector 10 judges that the pickup 2 is located at an intermediate-track-B which is an outer track than the intermediate-track-A. When the velocity detected by the linear-velocity-detecting-circuit 7 is higher than the reference-velocity-2, the gain selector 10 judges that the pickup 2 is located at the outermost track of the optical disk 1. The gain selector 10 adjusts the loop gain for the focus servo system 50 based on the above judgment (i.e., adjusts the value of the loop gain to become one of values set in advance, on each of the above judgments).

Next, the operation of the focus servo system 50 in rotating the optical disk 1 under the CLV control by using the second control system 42 is described hereinafter.

When the optical disk 1 is rotated under the CLV control, the optical disk 1 is controlled by the second control system 42 in such a manner that the linear velocity of the optical disk 1 at the track position of the optical disk 1 where the pickup 2 is located enters into the state of a predetermined constant linear velocity, based on the output signal of the linear-velocity-detecting-circuit 7. In this case, since the linear velocity is constant, the angular velocity detected by the angular-velocity-detecting-circuit 5 changes in accordance with the move of the pickup 2. That is, the angular velocity of the optical disk 1 is higher, for instance, when the pickup 2 is located at one of the inner tracks of the optical disk 1 comparing with the angular velocity in the occasion that the pickup 2 is located at one of the outer tracks of the optical disk 1. Therefore, the, control of the gain of the focus servo system 50 in the CLV control is performed by utilizing the change of the angular velocity of the optical disk 1 in such a manner that the gain selector 10 receives angular velocity information detected by the angular-velocity-detecting-circuit 5 and compares the velocity information with the plurality of reference velocities stored in the reference-velocity-storing-unit 9.

The following is a description on the operation of rotating the optical disk 1 under the CLV control by using one reference velocity (e.g., the reference-velocity-1) of the plurality of reference velocities stored in the reference-velocity-storing-unit 9.

When the velocity detected by the angular-velocity-detecting-circuit 5 is higher than the reference-velocity-1, the gain selector 10 judges that the pickup 2 is located at one of the inner tracks of the optical disk 1, where the superficial fluctuation is small, and decreases the loop gain for the focus servo system 50. On the other hand, when the velocity detected by the angular-velocity-detecting-circuit 5 is lower than the reference-velocity-1, the gain selector 10 judges that the pickup 2 is located at one of the outer tracks of the optical disk 1, where the superficial fluctuation is large, and increases the loop gain for the focus servo system 50.

The following is a description on the operation of rotating the optical disk 1 under the CLV control by using the plurality of reference velocities (e.g., reference-velocity-0, reference-velocity-1 and reference-velocity-2), which are stored in the reference-velocity-storing-unit 9, are used.

When the velocity detected by the angular-velocity-detecting-circuit 5 is higher than the reference-velocity-0, the gain selector 10 judges that the pickup 2 is located at the innermost track of the optical disk 1. When the velocity detected by the angular-velocity-detecting-circuit 5 is lower than the reference-velocity-0 but higher than the reference-velocity-1, the gain selector 10 judges that the pickup 2 is located at an intermediate-track-A between the innermost track and the outermost track of the optical disk 1. When the velocity detected by the angular-velocity-detecting-circuit 5 is lower than the reference-velocity-1 but higher than the reference-velocity-2, the gain selector 10 judges that the pickup 2 is located at an intermediate-track-B which is an outer track than the intermediate-track-A. When the velocity detected by the angular-velocity-detecting-circuit 5 is lower than the reference-velocity-2, the gain selector 10 judges that the pickup 2 is located at the outermost track of the optical disk 1. The gain selector 10 adjusts the loop gain for the focus servo system 50 based on the above judgment (i.e., adjusts the value of the loop gain to become one of values set in advance, on each of the above judgments).

As described in the above, in the pickup control device in this exemplary embodiment, the focus servo system 50 is operated based on the loop gain properly adjusted by the gain selector 10 by utilizing the velocity information detected by the angular-velocity-detecting-circuit 5 and the linear-velocity-detecting-circuit 7, which (i.e., both detecting circuits) are also used for the control of the rotational velocity of the optical disk 1. That is, the focus servo system 50 can be operated with a more adequate loop gain without directly detecting the track position where the pickup 2 is located by using an additional unit comprising, for instance, a light emitter and a light sensor for detecting the track position where the pickup 2 is located. As a result, the effective saving of electricity and cost in the optical disk having the above pickup control device of the present invention is realized.

The operation of the tracking servo system 70 can be performed in a manner similar to the above description on the focus servo system 50.

Second Exemplary Embodiment

Figure 2:
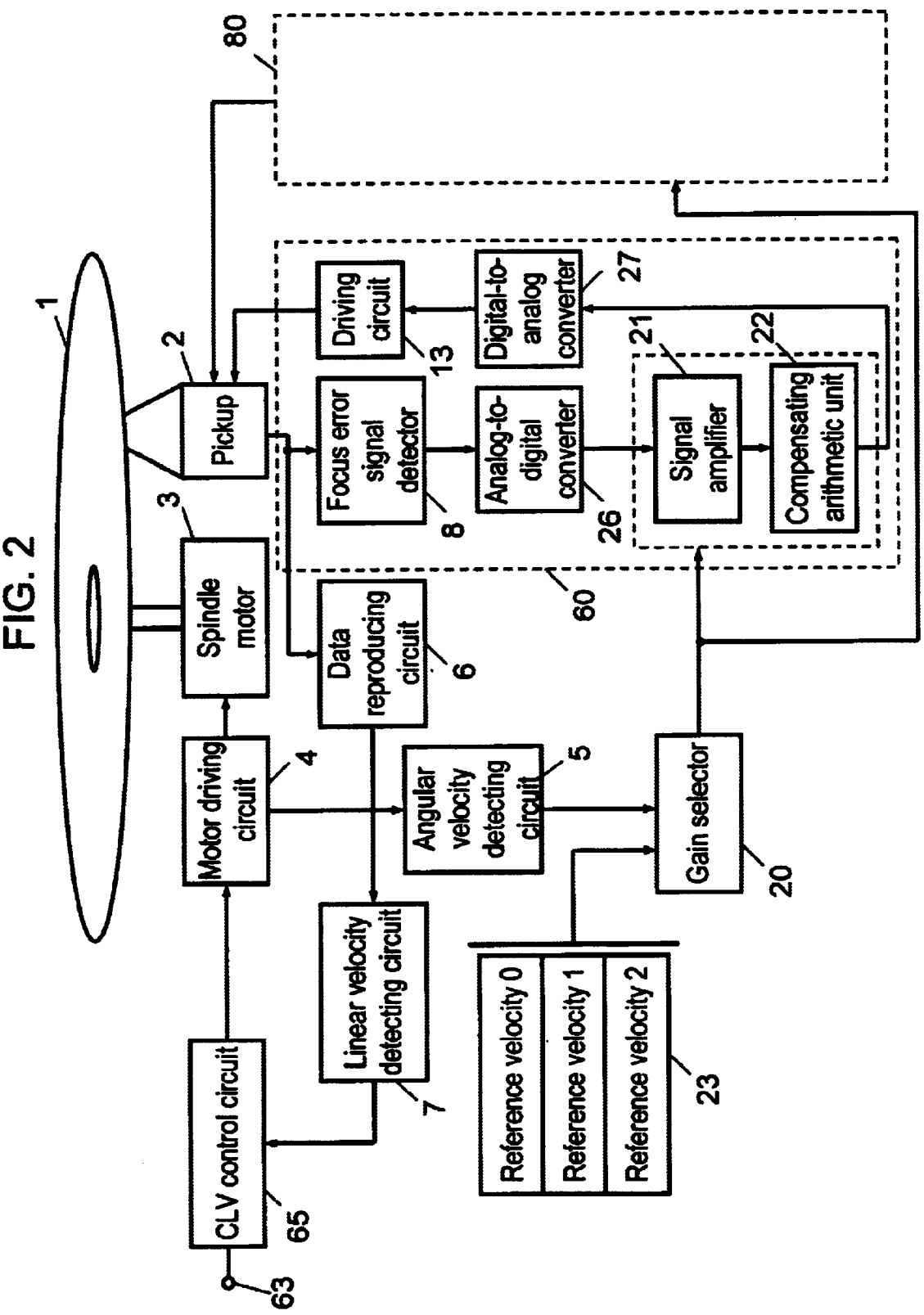
FIG. 2 is a block diagram showing a pickup control device for an optical disk drive in a second exemplary embodiment in the present invention.

FIG. 2 is a block diagram showing a pickup control device for an optical disk drive in a second exemplary embodiment in the present invention.

In FIG. 2, the same numerals are applied as in FIG. 1 for the components having the same functions as in FIG. 1 of the first exemplary embodiment.

A difference from the first exemplary embodiment is that, in this exemplary embodiment, the output signal of the focus-error-signal-detector 8 is converted to a digital signal by an analog-to-digital converter 26 of a focus servo system 60. The digital signal is processed by a signal amplifier 21 and a compensating arithmetic circuit 22 and fed into a digital-to-analog converter 27. The digital-to-analog converter 27 converts the digital signal to an analog signal and feeds the analog signal into the driving circuit 13. While, a CLV control circuit 65 generates a CLV signal based on the output signal of the linear velocity detector (e.g., linear-velocity-detecting-circuit) 7 and a predetermined linear velocity instruction value received through a terminal 63, and feeds the CLV signal into the motor driving circuit 4.

The other difference from the first exemplary embodiment is that, a gain selector 20 compares the angular velocity detected by the angular-velocity-detecting-circuit 5 with the reference velocities (e.g., reference-velocity-0, reference-velocity-1, and reference-velocity-2) and determines a sampling rate for operating the digital processing circuits (i.e., analog-to-digital converter 26, signal amplifier 21, compensating arithmetic unit 22 and digital-to-analog converter 27) in the loop of the focus servo system 60.

When the optical disk 1 is a compact disk (CD), the operation of writing or reading information on or from the optical disk 1(i.e., CD) is performed under the CLV control. For example, in reading recorded information from the CD rotated at an ordinary velocity, the rotational velocity (i.e., angular velocity) of the CD changes from 535 rpm (when the pickup 2 is located at the innermost track of the CD) to 200 rpm (when the pickup 2 is located at the outermost track of the CD).

In the loop of the focus servo system 60, when the optical disk 1 is rotated under the CLV control, the sampling rate for operating the digital processing circuits of the focus servo system 60 is inversely proportional to the rotational velocity (i.e., angular velocity) of the optical disk 1. That is, in the operation of the CD, the gain selector 20 adjusts the sampling rate for operating the digital processing circuits of the focus servo system 60 in such a manner that, when the pickup 2 is located at the outermost track of the optical disk 1, the relative sampling rate against the rotational velocity of the CD is twice as high as the relative sampling rate in the occasion that the pickup 2 is located at the innermost track of the CD.

In practice, since the sampling rate for operating the digital processing circuits in elapsed time (e.g., in one second) is substantially constant, the frequency of a clock pulse (which is proportional to the rotational velocity of the CD) for operating the signal amplifier 21 and the compensating arithmetic unit 22 (which are operated based on the sampling rate) is decreased in accordance with the move of the pickup 2 from the innermost track toward the outermost track of the CD, and, when the signal processing in the signal amplifier 21 and the compensating arithmetic unit 22 are terminated (i.e., when the angular-velocity-detecting-circuit 5 terminates the generation of velocity signal), the generation of the clock pulse is also terminated.

The following is a description on the operation of the pickup control device in this exemplary embodiment, in which one (e.g., the reference-velocity-1) of the plurality of the reference velocities stored in the reference-velocity-storing-unit 23 is used. In rotating the optical disk 1 under the CLV control, the angular velocity detected by the angular-velocity-detecting-circuit 5 in the occasion that the pickup 2 is located at one of the inner tracks of the optical disk 1 is higher comparing with the angular velocity in the occasion that the pickup 2 located at one of the outer tracks of the optical disk 1. Therefore, when the velocity detected by the angular-velocity-detecting-circuit 5 is higher than the reference-velocity-1, the gain selector 20 judges that the pickup 2 is located at one of the inner tracks of the optical disk 1, and adjusts the relative sampling rate against the angular velocity to low value. On the other hand, when the velocity detected by the angular-velocity-detecting-circuit 5 is lower than the reference-velocity-1, the gain selector 20 judges that the pickup 2 is located at one of the outer tracks of the optical disk 1, and adjusts the relative sampling rate against the angular velocity to high value.

The following is a description on the operation of the pickup control device in this exemplary embodiment, in which a plurality of the reference velocities (e.g., reference-velocity-0, reference-velocity-1 and reference-velocity-2), which are stored in the reference-velocity-storing-unit 23, are used.

When the velocity detected by the angular-velocity-detecting-circuit 5 is higher than the reference-velocity-0, the gain selector 20 judges that the pickup 2 is located at the innermost track of the optical disk 1. When the velocity detected by the angular-velocity-detecting-circuit 5 is lower than the reference-velocity-0 but higher than the reference-velocity-1, the gain selector 20 judges that the pickup 2 is located at an intermediate-track-A between the innermost track and the outermost track of the optical disk 1. When the velocity detected by the angular-velocity-detecting-circuit 5 is lower than the reference-velosity-1 but higher than the reference-velocity-2, the gain selector 20 judges that the pickup 2 is located at an intermediate-track-B which is an outer track than the intermediate-track-A. When the velocity detected by the angular-velocity-detecting-circuit 5 is lower than the reference-velocity-2, the gain selector 20 judges that the pickup 2 is located at the outermost track of the optical disk 1. Based on the above judgment, the gain selector 20 adjusts the relative sampling rate against the angular velocity of the optical disk 1 (i.e., adjusts the relative sampling rate against the angular velocity of the optical disk 1 to become one of the values set in advance, on each of the above judgments).

As described in the above, in this exemplary embodiment, in a manner similar to the description on the first exemplary embodiment, the operation of the digital processing circuits is performed based on an optimal sampling rate which is determined based on the rotational velocity of the optical disk 1 at the track position where the pickup 2 is located, also the frequency of the clock pulse for the digital processing circuits is adjusted or the generation the clock pulse is terminated in accordance with the change of the relative value of the sampling rate against the angular velocity of the optical disk 1, without installing an additional unit for directly detecting the track position where the pickup 2 is located. As a result, the effective saving of electricity and cost in the optical disk drive having the above pickup control device of the present invention can be realized.

The operation of the tracking servo system 80 is performed in a manner similar to the above description on the focus servo system 60 since the structure of the tracking servo system 80 is similar to the structure of the focus servo system 60. The difference between these is that a tracking-error-signal-detector is used in the tracking servo system 80 in place of the focus-error-signal-detector 8 of the focus servo system 60.

As described in the above, in the present invention, the loop gains for the focus servo system and the tracking servo system are optimized, also the relative sampling rate against the rotational velocity of the optical disk is optimized, without installing an additional unit which is exclusively used for detecting the track position where the pickup is located. As a result, the effective saving of electricity and cost in the optical disk drive having the pickup control device of the present invention is realized.

INDUSTRIAL APPLICABILITY

The pickup control device of the present invention is used for an optical disk drive. The pickup control device of the present invention is that in the optical disk drive comprising a focus servo system for controlling the focusing operation of the pickup of the optical disk drive, and a tracking servo system for controlling the tracking operation of the pickup, respective loop gains for the focus servo system and the tracking servo system can be optimized, also the relative sampling rate against the rotational velocity of an optical disk for operating the digital processing circuits of the focus servo system and the tracking servo system can be optimized by utilizing the velocity signal generated by an angular velocity detector and a linear velocity detector which (i.e., both detectors) are also used for controlling the rotational velocity of the optical disk, without installing an additional unit comprising various component parts for detecting the track position where the pickup is located. As a result, the effective saving of electricity and cost in the optical disk drive having the pickup control device of the present invention is realized.

What is claimed is:

1. A pickup control device for an optical disk drive which performs one of operations of writing information on an optical disk and reading information from said optical disk with a pickup of said optical disk drive comprising a focus servo system for controlling focusing operation of said pickup and a tracking servo system for controlling tracking operation of said pickup, said pickup control device comprising:

(a) a first control system which comprises an angular velocity detector for detecting angular velocity of said optical disk, and controls said optical disk based on the angular velocity detected by said angular velocity detector in such a manner that said optical disk enters into a state of rotation at a predetermined constant angular velocity; and (b) a second control system which comprises a linear velocity detector for detecting linear velocity of said optical disk at a track position of said optical disk where said pickup is located, and controls the linear velocity in such a manner that the linear velocity enters into a state of predetermined constant linear velocity, wherein said first control system and said second control system are alternatively operated in such a manner that at least one of a) a loop gain is adjusted or a sampling rate is determined for said focus servo system and b) a loop gain is adjusted or a sampling rate is determined for said tracking servo system based on the angular velocity detected by said angular velocity detector of said first control system when said disk is rotated under the control of said second control system, and wherein at least one of the loop gain for said focus servo system and the loop gain for said tracking servo system is decreased when the linear velocity detected by said linear velocity detector is lower than a reference velocity set in advance, and, at least one of the loop gain for said focus servo system and the loop gain for said tracking servo system is increased when the linear velocity detected by said linear velocity detector is higher than the reference velocity in an occasion of rotating said disk under the control of said first control system.

2. The pickup control device for an optical disk drive according to claim 1, wherein at least one of the loop gain for said focus servo system and the loop gain for said tracking servo system is decreased when the linear velocity detected by said linear velocity detector is lower than a reference velocity set in advance, and, at least one of the loop gain for said focus servo system and the loop gain for said tracking servo system is increased when the linear velocity detected by said linear velocity detector is higher than the reference velocity, in an occasion of rotating said disk under the control of said first control system.

3. The pickup control device for an optical disk drive according to claim 1, wherein a plurality of said reference velocities are set in advance.

4. A pickup control device according to claim 1, wherein said loop gain is adjusted for said focus servo system and said loop gain is adjusted for said tracking servo system.

5. A pickup control device according to claim 1, wherein said sampling rate is determined for said focus servo system and said sampling rate is determined for said tracking servo system.

6. A pickup control device according to claim 1, wherein said loop gain for said focus servo system and said loop gain for said tracking servo system are adjusted based on the linear velocity detected by said linear velocity detector of said second control system when said disk is rotated under the control of said first control system.

7. A pickup control device for an optical disk drive which performs one of operations of writing information on an optical disk and reading information from said optical disk with a pickup of said optical disk drive comprising a focus servo system for controlling focusing operation of said pickup and a tracking servo system for controlling tracking operation of said pickup, said pickup control device comprising:

(a) a first control system which comprises an angular velocity detector for detecting angular velocity of said optical disk, and controls said optical disk based on the angular velocity detected by said angular velocity detector in such a manner that said optical disk enters into a state of rotation at a predetermined constant angular velocity; and (b) a second control system which comprises a linear velocity detector for detecting linear velocity of said optical disk at a track position of said optical disk where said pickup is located, and controls the linear velocity in such a manner that the linear velocity enters into a state of predetermined constant linear velocity, wherein said first control system and said second control system are alternatively operated in such a manner that at least one of
  a) a loop gain is adjusted or a sampling rate is determined for said focus servo system and
  b) a loop gain is adjusted or a sampling rate is determined for said tracking servo system based on the angular velocity detected by said angular velocity detector of said first control system when said disk is rotated under the control of said second control system, and
wherein at least one of the loop gain for said focus servo system and the loop gain for said tracking servo system is decreased when the angular velocity detected by said angular velocity detector is higher than a reference velocity set in advance, and, at least one of the loop gain for said focus servo system and the loop gain for said tracking servo system is increased when the angular velocity detected by said angular velocity detector is lower than the reference velocity, in an occasion of rotating said disk under the control of said second control system.

8. The pickup control device for an optical disk drive according to claim 7, wherein a plurality of said reference velocities are set in advance.

9. A pickup control device for an optical disk drive which performs one of operations of writing information on an optical disk and reading information from said optical disk with a pickup of said optical disk drive comprising a focus servo system for controlling focusing operation of said pickup and a tracking servo system for controlling tracking operation of said pickup, said pickup control device comprising:

(a) a first control system which comprises an angular velocity detector for detecting angular velocity of said optical disk, and controls said optical disk based on the angular velocity detected by said angular velocity detector in such a manner that said optical disk enters into a state of rotation at a predetermined constant angular velocity; and (b) a second control system which comprises a linear velocity detector for detecting linear velocity of said optical disk at a track position of said optical disk where said pickup is located, and controls the linear velocity in such a manner that the linear velocity enters into a state of predetermined constant linear velocity, wherein said first control system and said second control system are alternatively operated in such a manner that at least one of
  a) a loop gain is adjusted or a sampling rate is determined for said focus servo system and
  b) a loop gain is adjusted or a sampling rate is determined for said tracking servo system based on the angular velocity detected by said angular velocity detector of said first control system when said disk is rotated under the control of said second control system, and
wherein at least one of the sampling rate for operating said digital processing circuit of said focus servo system and the sampling rate for operating said digital processing circuit of said tracking servo system is relatively decreased against rotational velocity of said disk when the angular velocity detected by said angular velocity detector is higher than a reference velocity set in advance, and, at least one of the sampling rate for operating said digital processing circuit of said focus servo system and the sampling rate for operating said digital processing circuit of said tracking servo system is relatively increased against rotational velocity of said disk when the angular velocity detected by said angular velocity detector is lower than the reference velocity, in an occasion of rotating said disk under the control of second control system.

\* \* \* \* \*